May 30, 1933. G. W. MORRIS 1,911,641
TIRE DEFLATION SWITCH
Filed Sept. 27, 1929
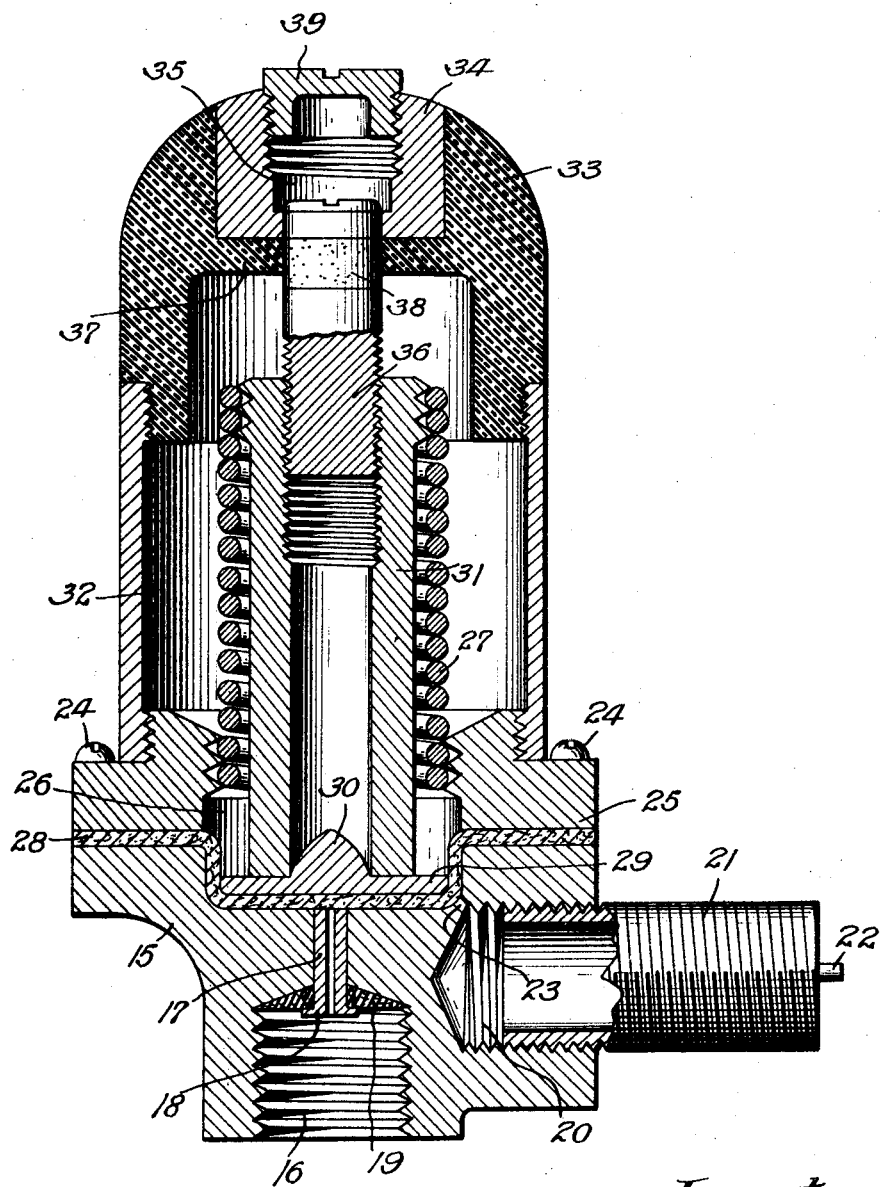
Inventor:
Geo. W. Morris
By M. Talbert Dick
ATTORNEY Patented May 30, 1933

1,911,641

UNITED STATES PATENT OFFICE

GEORGE W. MORRIS, OF DES MOINES, IOWA

TIRE DEFLATION SWITCH

Application filed September 27, 1929. Serial No. 395,584.

The principal object of this invention is to provide a device for warning the operator of an automotive vehicle when one or more of the pneumatic tires of the vehicle is under-inflated.

A further object of this invention is to reduce automotive vehicle accidents serious to life and property caused by under-inflated tires.

A still further object of my invention is to increase the life and service of pneumatic tires when used on automobiles, trucks, and the like.

A still further object of this invention is to provide a tire meter for the pneumatic tires of vehicles that is economical in manufacture and durable in use.

These and other objects will be apparent to those skilled in the art.

My invention consists in the construction, arrangement, and combination of the various parts of the device, whereby, the objects contemplated are attained as hereinafter more fully set forth, pointed out in my claims and illustrated in the accompanying drawing, in which:

Fig. 1 is a side sectional view of my tire deflation switch.

Many automobile accidents today are caused by under-inflated tires. This is especially true when high speed is being realized and balloon tires used. My invention not only reduces the number of such accidents but greatly prolongs the life of the tires by warning the vehicle operator that one or more of his tires are too low in air pressure for successful and durable service. In fact in many instances a tire may become so low in pressure without the knowledge of the operator that the wheel rim will cut and damage the tire.

The base portion of the valve portion of the invention 15 has a tire threaded bore 16 designed to be threaded onto the valve stem. Passing longitudinally through the base portion and communicating with a depression in the top of the base and with the bore 16 is the small tube 17 having a head 18. This head 18 depresses the valve pin in the stem 14 and thereby permits air from the inner tube to pass through the tube 17. This head also retains the resilient washer 19 which engages the marginal edge of the stem 14 and prevents any air leakage.

The numeral 20 designates a bore in the side of the base portion 15 into which is designed to be threaded a valve stem 21, having the valve pin assembly 22. The small passageway 23 communicates with the bore 20 at one of its ends and its other end communicates with the depression at the top of the base portion 15. Secured by cap screws 24 to the base portion 15 is the block member 25 having a depression 26 on its underside registering with the depression on the top of the base portion 15, respectively. Having its lower end threaded into an opening, passing through the block member 25 and communicating with the depression 26 is the coil spring 27 as shown in Fig. 2. Between the base portion 15 and the block member 25 is a resilient disk 28 made of rubber or the like and having its central portion resting in the bottom of the depression on the upper side of the base portion 15. By this arrangement when air under pressure is forced into the stem 21 it will pass through the passageway 23, slightly raise the resilient disk 28 and from the underside of the disk 28 will pass through the tube 17 into the inner tube to which the device is secured. In other words a tire equipped with my invention may be inflated without detaching the device. Resting in the depression in the base portion 15 and on the upper surface of the resilient disk 28 is the centering washer 29 having the projection 30. Having its upper end secured to the spring 27 by being threaded into the same is the pipe 31. This pipe extends downwardly and embraces the projection 30 as shown in Fig. 2. Having its lower end threaded on the block member 25 is the sleeve 32. Threaded in the upper portion of the sleeve 32 is the cap member 33 made of suitable non-conductive material such as bakelite or the like. Secured by suitable means in the top of the cap member 33 is the metallic insert 34 having a bore 35 in its top.

Extending through the member 34 is a passageway of less diameter than the diameter of the bore 35. Slidably mounted in this passageway and threaded into the pipe 31 is the rod 36. It will here be noted that this rod 36 is also slidably mounted in the webbing 37 of the cap member 33. The numeral 38 designates a sleeve around the rod 36 of non-conductive material designed to be in approximately the same plane as the webbing 37 when the pipe 31 is in a lowered position shown in the drawing. I have used the numeral 39 to designate a metallic plug threaded in the bore 35 for enclosing the same.

Once my tire deflation switch is mounted on a valve stem, it should be connected in an electric circuit, the two lead wires of which should be secured to one of the screws 24 and the metallic plug 39 respectively. This electric circuit may easily lead from a moving wheel of a vehicle by suitable means such as brushes operating on metallic rings secured to the wheel. Also interimposed in this electric circuit should be a warning device such as an electric light bulb. By this arrangement, when the vehicle tire is properly inflated, the air pressure from the same will force the resilient disk upwardly, thereby carrying with it the pipe 31. When the pipe 31 is in an elevated condition the non-conductive sleeve 38 on the rod 36 will be in a position adjacent the passageway in the lower portion of the metallic insert 34. On the other hand, if the air pressure in the pneumatic tire is below normal it will not have force enough to raise the resilient disk 28 against the action of the spring 27 and the spring 27 will hold the pipe 31 in a lowered position. When in this position the metallic end of the rod 36 will be adjacent and making contact with the inside of the passageway in the lower portion of the metallic insert 34, as shown in the drawing. When such a condition exists the electric light bulb in the circuit and which should be near the operator, will light and warn the operator that one of his tires is under-inflated.

Upon inflating the pneumatic tire to the proper pressure the rod 36 will be moved upwardly as before described and the upper metallic portion of that rod will be moved out of engagement with the passageway in the lower portion of the metallic insert 34, thereby breaking the described electric circuit and extinguishing the bulb.

In order to adjust the invention to light the light its various designated low pressures it is merely necessary to screw the rod 36 inwardly or outwardly in the pipe 31. This is necessary as various tires are designed to operate on various pressures.

By leaving the valve pin and assembly in the inner tube valve stem, air under pressure will be retained in the pneumatic tire when the same is being placed or removed from the vehicle wheel. Whenever a pneumatic tire is installed on a wheel or removed therefrom it is merely necessary to screw my invention onto the tire stem or unscrew the same from the tire stem as the case may be.

Some changes may be made in the construction and arrangement of my improved combination tire meter for designating pressures without departing from the real spirit and purpose of my invention, and it is my intention to cover by my claims any modified forms of structure or use of mechanical equivalents which may be reasonably included within their scope.

I claim:

1. In a device of the class described, a base member designed to be in communication with the inside of the valve stem of a pneumatic tire, a pipe passing through said base member, in communication with the top of said base member and having one end capable of engaging and depressing the valve pin in the said valve stem, a second valve stem threaded into the said base member, a valve in said second valve stem, a passageway in said base member having one end communicating with said second valve stem and its other end communicating with the top of said base member, a resilient disk extending over the top of said base member and in communication with said passageway and pipe, a sealed hood member secured on top of said base member and engaging the marginal edge of said disk, a member slidably mounted in said hood member having one end operatively engaging said flexible disk, a spring for yieldingly holding said member in operative engagement with said disk, an electrical contact member in said hood member, and an electrical contact member on said slidably mounted member capable of making contact with said first mentioned electrical contact member when said slidably mounted member is moved in one direction.

2. In a device of the class described, a base member designed to be in communication with the inside of a valve stem of a pneumatic tire, a depression in the top of said base member, a passageway in said base member having one end communicating with the inside of said valve stem and its other end communicating with said depression, an elastic disk secured on said base member and over said depression, a slidably mounted member having one end operatively engaging said disk, a coil spring for yieldingly holding said slidably mounted member in operative engagement with said disk and into said depression, a means on said slidably mounted member for making and breaking an electrical circuit when said member is reciprocated, and a sealed hood member secured on said base member inclosing the top of said disk member, the slidably mounted member, the coil spring and said means.

3. In a device of the class described, a base member designed to be threaded onto the valve stem of a pneumatic tire, a depression in the top of said base member, a passageway in the bottom of said depression communicating with the inside of said valve stem, a ring member secured on the top of said base member, a resilient disk between said base member and said ring member, a sleeve threaded onto said ring member, a cap member of non-conductive material threaded in the top of said sleeve, a webbing member integrally formed on the inside of said cap member, a centering washer resting on said disk, a pipe having one end engaging said washer, a coil spring having one end secured to said ring and its other end secured to said pipe, a metallic bearing member in said cap adjacent said webbing member, a rod threaded into said pipe and slidably mounted in said webbing and said metallic bearing member, and a collar of non-conductive material on said rod capable of being adjacent said bearing when said pipe is moved in one direction.

GEORGE W. MORRIS.